March 24, 1925.
W. SCHWALGE
1,531,142
METHOD AND DEVICE FOR SHIFTING AND TURNING EGGS WHILE BEING HATCHED
Filed Jan. 15, 1924   2 Sheets-Sheet 1
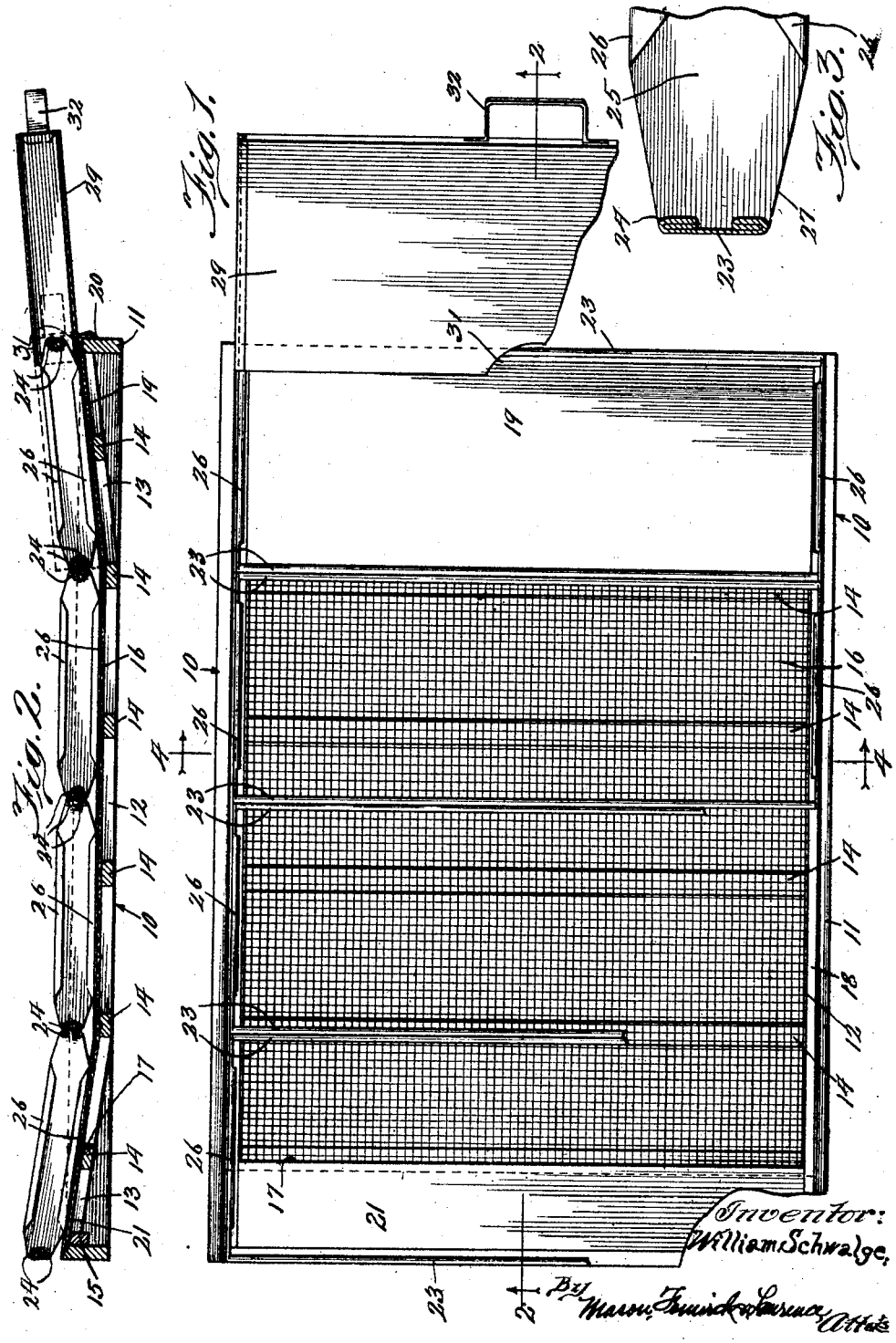

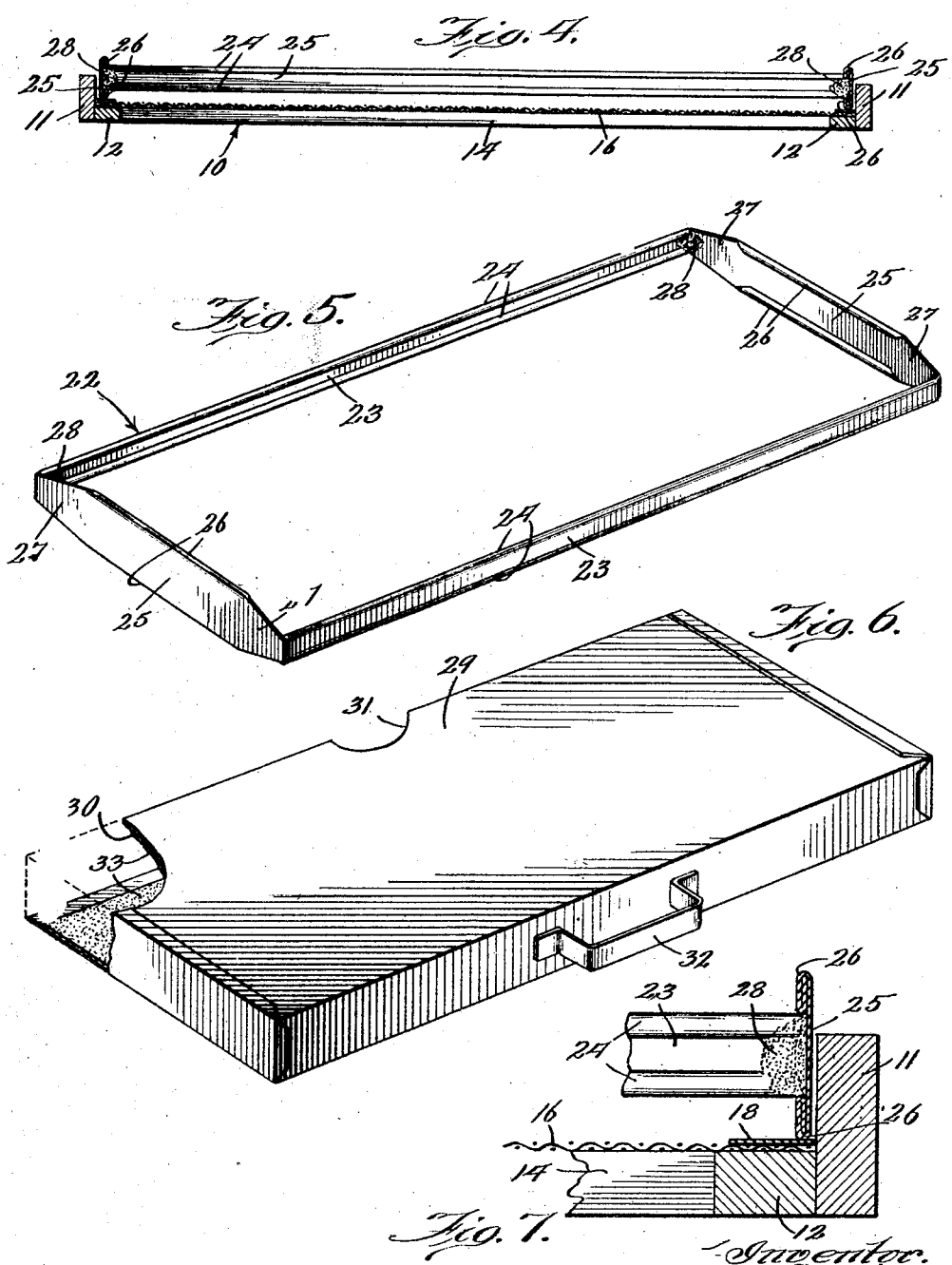

Patented Mar. 24, 1925.

1,531,142

UNITED STATES PATENT OFFICE.

WILLIAM SCHWALGE, OF ELMHURST, ILLINOIS.

METHOD AND DEVICE FOR SHIFTING AND TURNING EGGS WHILE BEING HATCHED.

Application filed January 15, 1924. Serial No. 686,308.

*To all whom it may concern:*

Be it known that I, WILLIAM SCHWALGE, a citizen of the United States, residing at Elmhurst, in the county of Du Page and State of Illinois, have invented certain new and useful Improvements in Methods and Devices for Shifting and Turning Eggs While Being Hatched; and I do hereby declare the following to be a full, clear, and exact description of the invention, such as will enable others skilled in the art to which it appertains to make and use the same.

This invention relates to incubators and more particularly to improve means to facilitate the turning of the eggs during incubation and for shifting or changing the positions of the eggs relative to the egg chamber and a tray upon which the eggs are supported during the period of incubation, thereby subjecting all of the eggs to the same temperatures during such period and insuring a more uniform and better hatch.

In artificial incubation, eggs must be turned by hand or by mechanical means. As turning by hand is a slow process, mechanical devices have been adopted and resorted to to facilitate turning and to permit the turning operation to be carried on more quickly, but most if not all of such devices previously provided for this purpose, simply turn the eggs without shifting them to different positions or areas within the egg chamber and therefore the eggs in different parts of the chamber were subjected to different temperatures, with the result that the hatching percentage was greatly impaired. Shifting of the eggs to different positions in the egg chamber or supporting tray, is necessary and essential to effective hatching results, since every incubator has cooled areas or spots and if the eggs remain in such cool areas, they will not receive the proper heat units nor develop normally, with the result that many of the chicks die in the shell, while other eggs may be subjected to excessive heat units with corresponding disadvantages.

The present invention has been devised to overcome these objections and difficulties, and provides an improved and novel method of turning and shifting the eggs during the period of incubation, thereby insuring more effective hatching.

A further object of the invention is to provide a novel construction of tray adapted to support a series or plurality of frames in which the eggs are placed, and a lifting box or scoop adapted to be pushed over the frames and to conveniently release the same for depositing the frames of eggs upon the tray, whereby the eggs in the respective frames may be shifted or transposed to different positions relative to the egg chamber quickly and conveniently to insure that all of the eggs shall be subjected to uniform temperatures during the period of incubation and also receive the proper number of heat units to cause the proper and natural development of the eggs and maximum percentage of hatch.

A still further object of the invention is to so construct the tray as to insure maximum egg capacity and to hold the eggs closer together during the period of incubation, after testing, within safe limits, to permit the natural turning of the eggs due to their development during incubation, while the tray is so constructed to facilitate the lifting and depositing of the frames of eggs and turning of the eggs as an entirety in each frame, in addition to equalizing the heat throughout the area of the egg chamber and counteracting the tendency to form cool spots or areas, and particularly at the front and back of the machine.

Other and further objects will be apparent from the drawings as the description proceeds.

In the accompanying drawings:

Figure 1 is a plan view, partly broken away, showing my improved device for turning and shifting eggs.

Figure 2 is a longitudinal sectional view thereof, taken on the section line 2—2 of Figure 1.

Figure 3 is an enlarged detailed fragmentary sectional elevation showing a portion of one of the egg frames.

Figure 4 is a transverse sectional view taken on the section line 4—4 of Figure 1.

Figure 5 is a perspective view of one of the egg frames.

Figure 6 is a perspective view of a lifting box or scoop, adapted for changing the positions of the frames and the eggs therein, in the tray, one corner thereof being broken away and in section, and Figure 7 is an enlarged fragmentary sectional view at one side of the tray, and corresponding to the structure shown at one side of Figure 4.

Referring to the drawings in detail, in which like reference characters designate corresponding parts throughout the several views, 10 designates generally, a tray which consists of a rectangular frame 11, preferably of wood, with the sides and ends arranged on edge and suitably connected at the corners, as by mortise and tenon joints or otherwise. This frame is adapted to be accommodated in the egg chamber of the incubator in connection with which the tray is adapted to be used, and has secured to the inner faces of the sides thereof, rails 12 disposed flush with the bottom edges of the sides at their central portions and having inclined end portions 13 which extend up to the top edge of the frame 11.

The frame 11 of the tray 10 is provided with cross strips 14, which extend transversely between the side rails 12 and are connected thereto, so that the side rails and cross strips subtantially form a unit separate from the frame 11 in which it is secured. The cross strips are spaced apart in parallel relation and from the ends of the frame 11, but an end strip 15 is provided at one end of the frame, preferably the front, and is secured to the inner face thereof slightly below its top edge to form a seat with a surrounding ledge or shoulder. Mounted upon the bottom of the tray and secured to the cross strips and side rails thereof is a wire mesh bottom 16 which terminates at the inner end of the inclined portion at the back of the tray and extends partly over the inclined portion at the front of the tray and terminates at the adjacent cross strip 14, as indicated at 17, thus leaving the bottom of the tray open at the ends.

Metal strips or runners 18 are secured along the sides of the bottom 16 over the side rails 12 to facilitate the transfer of the frames and eggs as will be hereinafter more fully set forth. A wide sheet metal bottom portion 19 is provided at the back end of the tray between the adjacent end of the wire mesh bottom 16 and the end of the frame, over the opening. This bottom portion 19 is supported upon the cross strips, side rails and the adjacent end of the frame 11, being bent over and secured to the latter as indicated at 20, in the preferred construction.

At the opposite or front end of the tray, over the narrow open portion thereof, a sheet metal strip or bottom portion 21 is provided, the same resting upon the adjacent cross strip 14 in abutting relation to the adjacent end of the bottom 16 and the shoulders at the sides and end of the frame. This strip 21 rests upon the end strip 15 and the side rails 12, and has its ends inserted between the strips 18 and the side rails. Owing to the flexibility of the sheet metal of which the strip 21 is formed, it may be flexed and the ends inserted in the grooves formed between the strips 18 and the side rails or removed therefrom as desired, thus rendering the strip 21 removable from its position closing the opening in the bottom, so that an opening will be provided through which the chicks may drop down into a lower portion or nursery of the incubator at hatching time, usually on the 18th day.

In order to support the eggs upon the tray and permit the same to be shifted, that is transposed in their positions relative to the tray and thus the egg chamber, as well as turned or inverted, a series or plurality of frames 22, preferably four in number as shown, are provided. These frames are preferably, but not necessarily of metal, and each consists of cross strips 23 with the edges thereof reenforced as at 24, by folding or rolling the same, to provide a stiffening and strengthening means, and end strips 25 also folded or rolled, centrally as indicated at 26. The ends or trips 25 are wider than the sides or cross strips 23, and have their ends cut or tapered as at 27 for connection to the ends of the strips 23, being inserted in the ends thereof, through the medium of the grooves formed by the folded edges or portions 24, after being bent at right angles, as indicated at 28, and then soldered or otherwise suitably secured to form a rigid oblong frame.

The frames 22 are arranged upon the tray 10 as shown more particularly in Figures 1 and 2 of the drawings, two of the frames being disposed upon the central horizontal portion and the other two being disposed upon the inclined end portions. This arrangement overcomes the disadvantages of flat egg trays, which allow the eggs to lie loose in isolated groups, and causes them after testing, to lie close together, the construction being such that the trays slope or curve upwardly at the ends or front and back and slope to one side and hold the eggs close together the same as in a nest, and thus insure more even heating. In addition, this arrangement facilitates the changing of the positions of the eggs in the respective trays and the transposing of the same with respect to the trays, through the medium of a lifting box or scoop 29, as shown in Figures 1, 2 and 6 of the drawings, the tapered ends of the frames 22 disposing the strips 24 in spaced relation to the bottom of the tray and facilitating the engagement and disengagement of the scoop with respect thereto. The scoop 29 is in the form of a box closed on all sides except the front edge as indicated at 30, being flat and of such size as to accommodate one of the frames 22 and eggs therein. The top and bottom of the scoop are centrally cut out at their forward edges as indicated at 31, to provide hand-holes in connection with a handle 32 at the closed back edge of the scoop or metal receptacle forming the same, so as to facilitate slipping the scoop over a frame of eggs in the manner shown in Figures 1 and 2 of the drawings, or removing the same. A lining of asbestos or other suitable material, is provided in the scoop as indicated at 33 and is attached to the top and bottom and the back thereof but not to the ends which are formed separate and secured by soldering or otherwise, in the preferred construction, thus protecting the eggs from breakage as well as chilling thereof by contact with the cold metal of the scoop. It will be noted that the ends 25 engage the strips 18 and facilitate transposing and sliding the frames on the tray, as well as to protect the wire mesh from wear.

In accordance with my improved method and device for turning and shifting eggs during incubation, four or more frames are placed on the egg tray and the eggs in these frames, each frame accommodating 42 to 48 eggs according to the size, all parts being of metal and unbreakable. To turn the eggs, as well as to change the positions of the frames with the eggs therein, in respect to the tray and egg chamber, the tray is first removed from the egg chamber of the incubator and then the lifting box or scoop is pushed over the frame at the back and removed with the eggs. This is facilitated by reason of the wide sheet metal bottom portion 19, which is disposed at the back of the tray and permits the scoop to slide easily and smoothly under the eggs and frame, which it could not do on the wire mesh bottom. This is the end of the tray from which the frame of eggs is removed and then the three remaining frames of eggs are pushed back to make room in the front for the frame of eggs removed from the back. The lifting box or scoop is then inverted, thus turning the eggs in the frame held thereby and then placed in the front of the tray. The scoop is then pulled forwardly leaving the frame and eggs upon the tray at the front, the eggs being thus shifted to different positions of the egg chamber or tray, as well as turned and cooled as required for maximum hatching efficiency. During this time the incubator door is left open to air and cool the egg chamber in the same manner as practiced by the hen leaving the nest and all of the advantages thereof, including the hardening of the shell and the contraction and expansion thereof, which forces the air into the egg and results in chicks which are more hardy.

In changing the positions of the frames of eggs, the handle 32 and the cutouts 31 facilitate the pushing of the scoop over the frame and eggs and the discharge or removal thereof, each being grasped by one hand irrespective of the position of the scoop in either of the inverted positions. The wide sheet 19 at the back also increases the heat in the back where the tendency is generally to be cool, as the metal prevents the heat from going straight down into the machine during the circulation thereof. This is due to the upward slope of the sheet 19, and in fact, of the tray bottom, both at the back and front, but especially at the back where the wide strip of metal counteracts the cooling tendency which is not existent at the center.

At the front, the sheet metal strip 21 facilitates depositing of the frame of eggs on to the tray and counteracts the tendency to be cooler at the front, though not so cool at the back. This is partly facilitated by the sloping arrangement, and by having the strip 21 removable, it may be taken out on the 18th day to permit the chicks to drop down into the nursery. In addition, the sloping or curved formation of the tray not only facilitates transposing of the eggs to different positions, but enables the operator to take up the eggs and frame more smoothly, increases the heat, facilitates the working or sliding of the scoop in conjunction with the sheet metal bottom pieces and holds the eggs closer together after testing, to facilitate hatching, and furthermore, equalizes the heat at the front and back of the machine. By disposing the eggs in different positions, hatching is facilitated, as every incubator has cool spots and if the eggs remain in these cool spots or areas, they will not receive the proper heat units nor develop normally, resulting in the chicks dying in the shell. While I have shown described four frames, it is to be understood that any number may be used without departing from the spirit of the invention, and that all the eggs may be turned and shifted to different positions, as well as cooled, the eggs being shifted from front to back and each frame turned. The latter is accomplished by inverting the frames of egg after removal from the back and before depositing the same at the front, while the former is accomplished by pushing the front frames to the back, during which time the eggs are turned by engagement with the wire mesh bottom. I reserve the right to make such other changes as will not depart from the scope of the invention as hereinafter claimed.

It will also be apparent that if desired, the eggs may at any time be shifted from side to side of the tray and incubator chamber, in addition to being turned and shifted from front to back as heretofore described. This is done by simply scooping up or lifting a frame with the eggs therein, either at the back or at the front of the tray the same as in the act of inverting the frames of eggs after removal from the back. By this means, the eggs may be disposed at both sides of the tray and egg chamber at different times while being hatched.

Having thus described my invention, what I claim is:

1. An improved method of egg incubation consisting in disposing eggs to be hatched in a plurality of bottomless frames upon a tray for insertion and removal from an egg chamber of an incubator, and shifting the frames of eggs from the back to the front of the tray and chamber, and to other positions relative thereto, thereby turning the eggs.

2. An incubator tray including a frame having a flat central portion and upwardly sloping ends forming the bottom thereof, said bottom being of wire mesh with solid imperforate end portions.

3. In an incubator, a tray having a frame and a bottom, the central area of the bottom perforated, and the end areas of the bottom having a smooth imperforate surface.

4. In an incubator, an egg tray comprising a frame having side rails and cross strips, the end portions of the side rails sloping upwardly, a reticulated bottom thereon extending over the central portion of the tray and partly over a sloping portion produced by the side rails, and imperforate sheets on the other sloping portions, at least one of said sheets being removable to provide an opening in the bottom of the tray.

5. An incubator tray including a frame having a central flat portion and upwardly sloping end portions, the central portion and the adjacent part of one end portion being of wire mesh the outer part of said end portion and the other end portion being of sheet metal.

6. An improved device for shifting and turning eggs during incubation, including a tray having a bottom and side rails, and a series of bottomless egg frames arranged upon the tray and supported by the side rails.

7. In combination, a tray comprising a frame with side rails and cross strips, a foraminous bottom on the frame, and bottomless egg frames slidably arranged upon the side rails.

8. In combination, a rectangular tray with side rails and a bottom having upwardly sloping ends, egg frames supported upon the tray and engaging the side rails, said frames having tapered portions and a scoop adapted to engage and receive the frames for changing the relative positions thereof on the tray.

9. In combination, a tray having side rails with runners, a wire mesh bottom, upwardly sloping ends of imperforate sheet material between the bottom and ends of the tray, one of which is removable, and egg frames having reinforced edges slidably supported on the side rails and removable therefrom, said frames having tapered ends adapted to permit the same to be scooped up and transposed and slid to different positions on the tray.

In testimony whereof I affix my signature.

WILLIAM SCHWALGE.